United States Patent [19]

Meissner

[11] Patent Number: 5,081,712
[45] Date of Patent: Jan. 14, 1992

[54] METHOD AND APPARATUS FOR OBTAINING PHASE INSENSITIVE AND/OR POLARIZATION-INSENSITIVE OPTICAL HETERODYNE RECEIVER FOR A FSK-MODULATED TRANSMISSION SIGNAL

[75] Inventor: Eckhard Meissner, Munich, Fed. Rep. of Germany

[73] Assignee: Siemens Aktiengesellschaft, Munich, Fed. Rep. of Germany

[21] Appl. No.: 512,373

[22] Filed: Jun. 5, 1990

[30] Foreign Application Priority Data

Jun. 6, 1989 [DE] Fed. Rep. of Germany ....... 3918473

[51] Int. Cl.⁵ .................................................. H04B 10/00
[52] U.S. Cl. ....................................................... 359/191
[58] Field of Search ....................... 455/619, 616, 608; 370/2, 1

[56] References Cited

U.S. PATENT DOCUMENTS

| | | | |
|---|---|---|---|
| 4,718,120 | 1/1988 | Tzeng | 455/616 |
| 4,856,094 | 8/1989 | Heidrich et al. | 455/616 |
| 4,965,857 | 10/1990 | Auracher | 455/616 |
| 4,984,297 | 1/1991 | Manome | 455/619 |

FOREIGN PATENT DOCUMENTS 0250819  1/1988  European Pat. Off. ............ 455/616

OTHER PUBLICATIONS

Article entitled "Phase-Insensitive Zero-IF Coherent Optical Detection Using Sinusoidal Phase Modulation Instead of Phase Switching from the Proceedings of the ICOC 1988", Part 2, pp. 65-68.
Article entitled "New FSK Phase-Diversity Receiver in a 150 Mbits Coherent Optical Transmission System", Electronics Letters 28 Apr. 1988, vol. 24, No. 9, pp. 567-568.

*Primary Examiner*—Curtis Kuntz
*Assistant Examiner*—Kinfe-Michael Negash
*Attorney, Agent, or Firm*—Hill, Van Santen, Steadman & Simpson

[57] ABSTRACT

Apparatus and method for obtaining a phase insensitive and/or polarization insensitive optical heterodyne reception for a FSK modulated transmission signal which uses a low intermediate frequency relative to the data rate of the transmission signals and at every clock of the transmission signal, the phase is keyed between 0 and 90° at the starting time and in the middle of the clock time the polarization of the signal is keyed between two mutually orthogonal polarization conditions at the start of the second and the start of the fourth quarter of the clock time and the phase independent and/or polarization independent output signal of the receiver is obtained from the signal which is shift keyed in a simple optical heterodyne receiver for FSK modulated transmission signals.

8 Claims, 4 Drawing Sheets

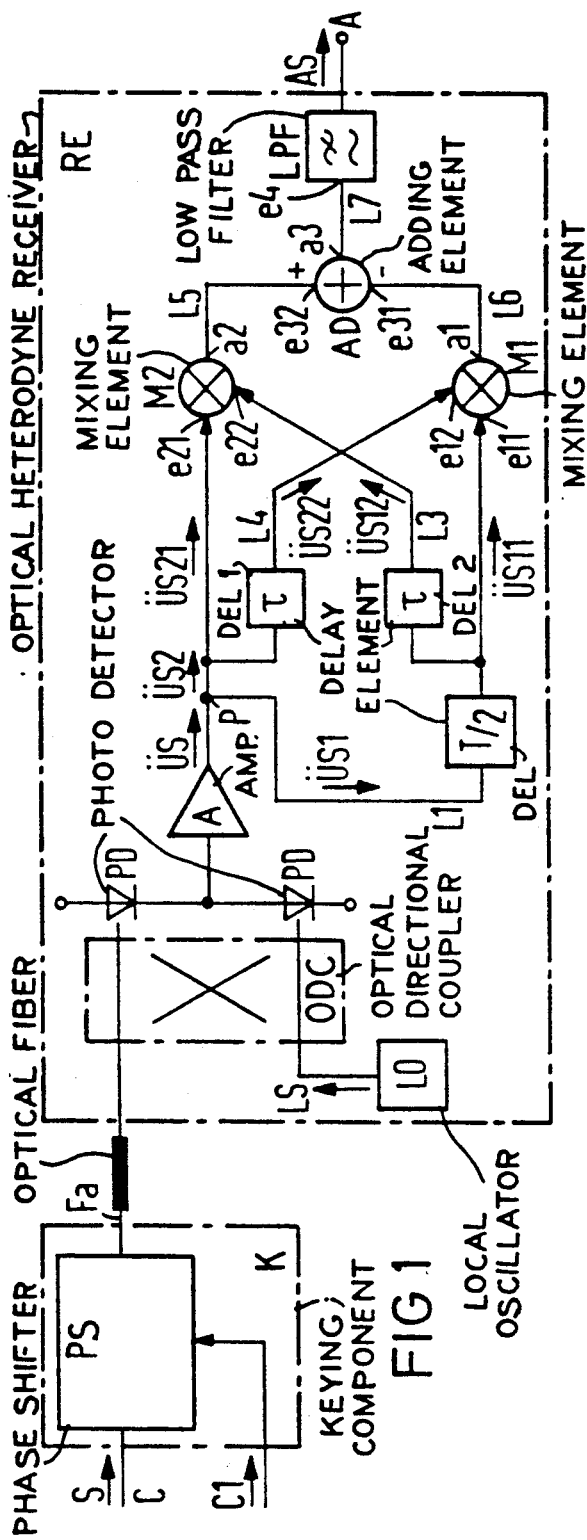
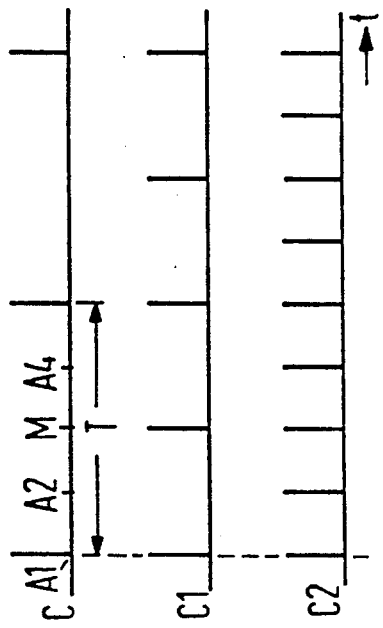

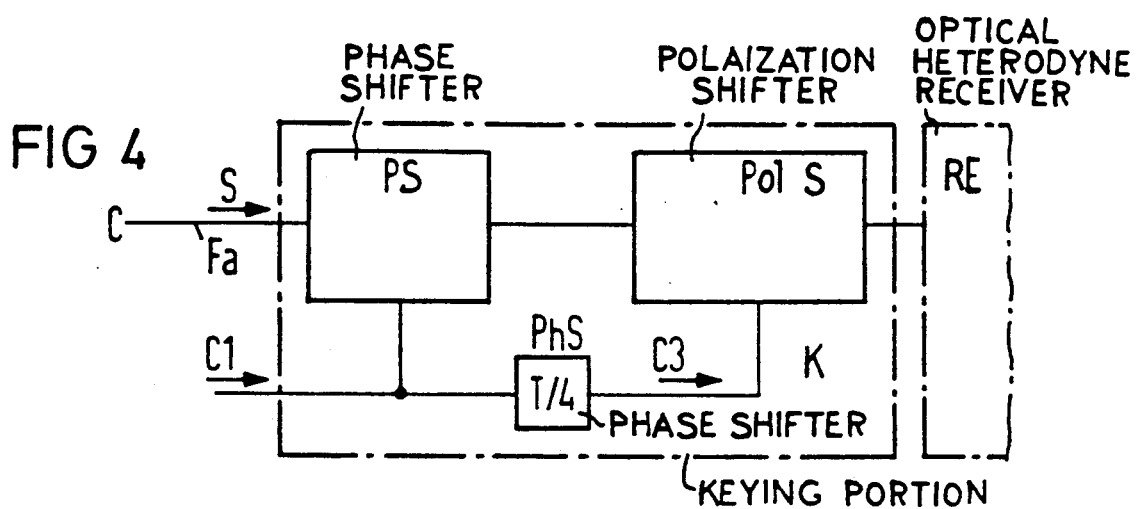
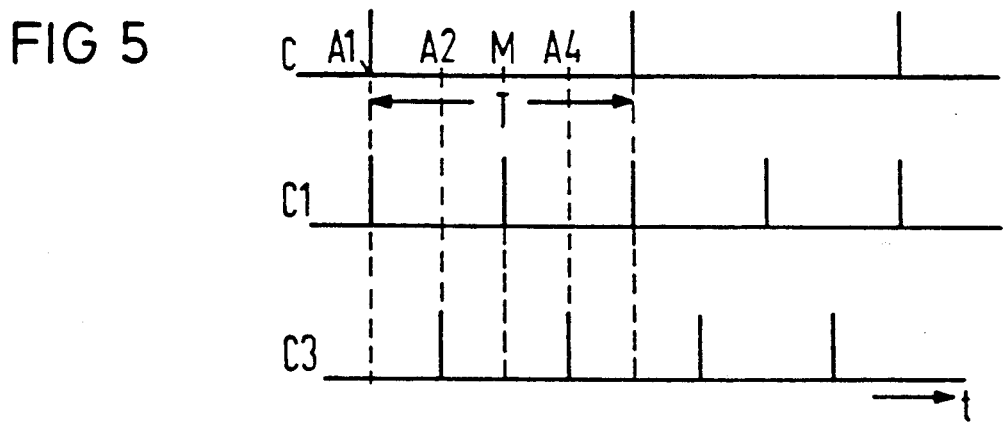
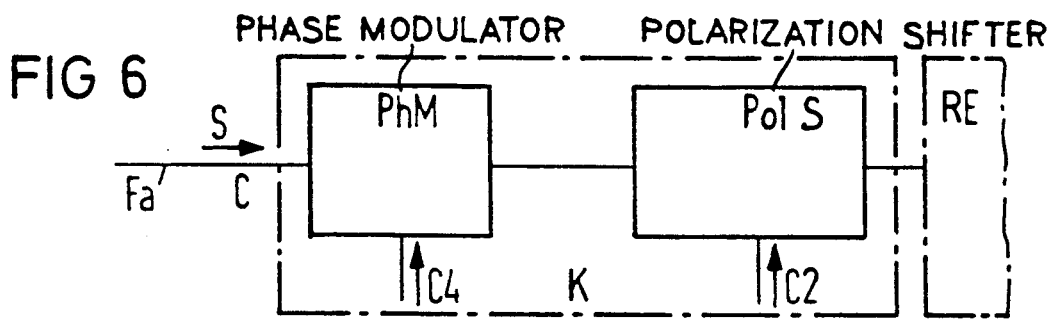
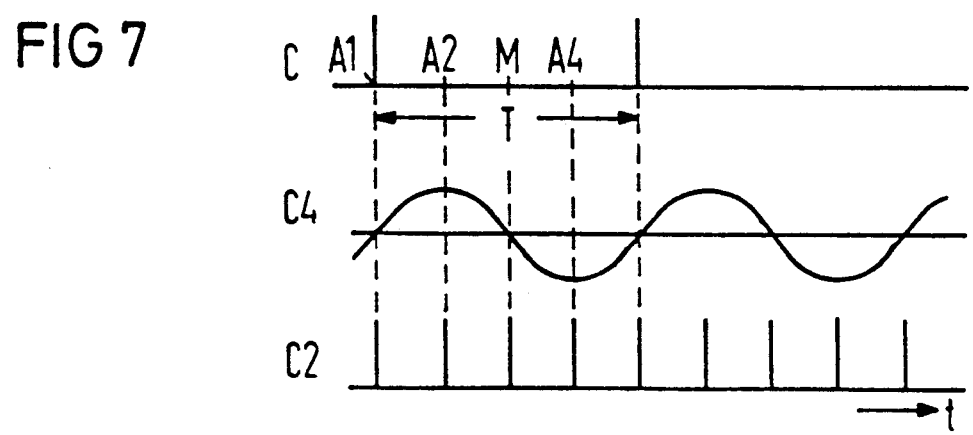

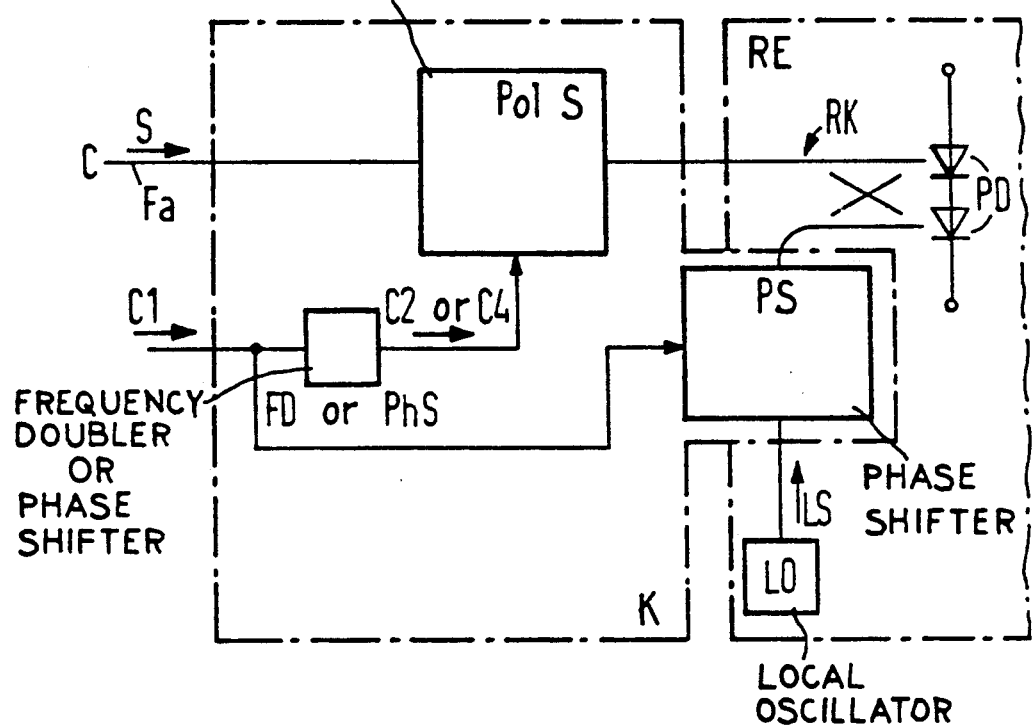

METHOD AND APPARATUS FOR OBTAINING PHASE IN SENSITIVE AND/OR POLARIZATION-INSENSITIVE OPTICAL HETERODYNE RECEIVER FOR A FSK-MODULATED TRANSMISSION SIGNAL

CROSS-REFERENCES TO RELATED APPLICATION

This application is related to application entitled "METHOD AND APPARATUS FOR OBTAINING A PHASE INSENSITIVE OR POLARIZATION INSENSITIVE OPTICAL HETERODYNE RECEIVER FOR DPSK OR ASK MODULATED TRANSMISSION SIGNAL", in which the inventors are Eckhard Meissner and Franz Auracher Ser. No. 510,859, filed Apr. 18, 1990.

BACKGROUND OF THE INVENTION

1. Field of the Invention

This invention relates in general to a method and apparatus for obtaining phase in-sensitive and/or polarization-insensitive optical heterodyne reception for a FSK-modulated transmission signal.

2. Description of the Prior Art

An optical heterodyne reception in which a supplied optical transmission signal is superimposed with an optical local oscillator signal and the output signal of the receiver is obtained from the superimposed optical signals by way of an intermediate frequency filter. The receiver sensitivity is generally dependent on the difference between the polarization conditions and the phases of the transmission signal and the local oscillator signal. When the polarization conditions of the transmission signal and the local oscillator signal do not coincide loss in sensitivity occurs during reception. When a low intermediate frequency which is one or more orders of magnitude lower relative to the data rate transmitted by the transmission signal, the optical signals superimposed on each other also periodically change between in phase and quadrature phase components.

Prior art known polarization diversity receivers provide that the transmission signal is divided into two polarization conditions which are orthogonal relative to each other and these are separately received and electrically added to obtain polarization-insensitive reception.

Phase diversity receivers wherein the co-phasal and quadrature components are separately received and electrically added can be employed for phase and sensitive reception.

These prior art receivers require a 90° hybrid which is difficult to realize in optical systems and also required two or four optical heterodyne receivers.

Phase-insensitive and/or polarization-insensitive receivers could also be obtained with a phase-control and/or polarization-control. However, such controls are extremely complicated.

SUMMARY OF THE INVENTION

It is an object of the present invention to provide a simple method and apparatus for obtaining phase insensitive and/or polarization-insensitive optical heterodyne reception for FSK-modulated transmission signals and which uses an intermediate frequency that is extremely low in comparison to the data rate of these signals.

It is an object of the present invention to provide a method and apparatus for obtaining phase-insensitive and/or polarization-insensitive optical heterodyne receiver for FSK-modulated optical transmission signal in which an electrical superposition signal is generated by superimposing the transmission signal with an optical local oscillator signal. An output signal is obtained from the superposition signal by low-pass filtering wherein at every clock of the transmission signal the phase of the signal or of the local oscillator signal is keyed between 0 and 90 degrees at the initiation in the middle of the clock time and/or every clock of the transmission signal, the polarization of the signal or of the local oscillator signal is keyed between two mutually orthogonal polarization conditions at the start of the second or at the start of the fourth quarter of the clock time and that a first signal portion of the superposition signal is delayed by one-half of the clock time in comparison to a second part of this signal and that a first part of the delayed first signal part and a first part of the second signal part which has been delayed relative to the second signal part by a short time are multiplied with each other and a second part of the second part signal and a second part of the first part signal delayed by a short time span are multiplied with each other and the first and second parts multiplied by each other are added and then passed through a low-pass filter.

The invention is based on data-synchronous phase shift keying or sinusoidal phase modulation and the latter is known from proceedings of the ECOC 1988, Part II, pages 65–68 and/or data-synchronous polarization-shift-keying of the transmission signal.

In the method according to the invention mutually independent phase in sensitive reception is obtained by phase-shift-keying and polarization-insensitive reception is obtained by the polarization-shift-keying. When both are used simultaneously phase-insensitive and polarization-insensitive reception results.

It can be mathematically demonstrated that the reception is phase-insensitive and/or polarization-insensitive, in other words, that the output signal of the receiver is phase-independent and/or polarization-independent when using the method and apparatus of the invention.

Especially advantageous apparatus for the implementation of the method uses an optical heterodyne receiver and a phase shifter and optical fiber which comprises a simple apparatus.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a schematic view of apparatus for practicing the method of the invention which includes an optical heterodyne receiver and a phase-shift-keying portion connected to the input of the receiver;

FIG. 2 comprises a plot of clock sequences versus time for explaining the invention;

FIG. 3 is a block diagram of a phase and polarization-shift-keying component which can be used instead of the phase-shift-keying component of FIG. 1;

FIG. 4 is a block diagram illustrating another phase and polarization-shift-keying component which can be used instead of the keying components of FIGS. 1 or 3;

FIG. 5 is a plot of the clock signals versus time which illustrate the signals which clock the transmission signal and control the keying portion of the component of FIG. 4;

FIG. 6 is a plot diagram of an additional phase and polarization shift-keying component which can be used instead of the keying components of FIGS. 1, 3 and 4;

FIG. 7 is a plot against time illustrating the clock signals which control the transmission signal and a sinusoidal control signals synchronized therewith and a clock signal which is synchronized for controlling the keying component of FIG. 6;

FIG. 10 is a block diagram of a phase shifter connected between the optical means and the local oscillator and in which a polarization shifter is connected at the transmitter side.

DESCRIPTION OF THE PREFERRED EMBODIMENTS

Figure 8:
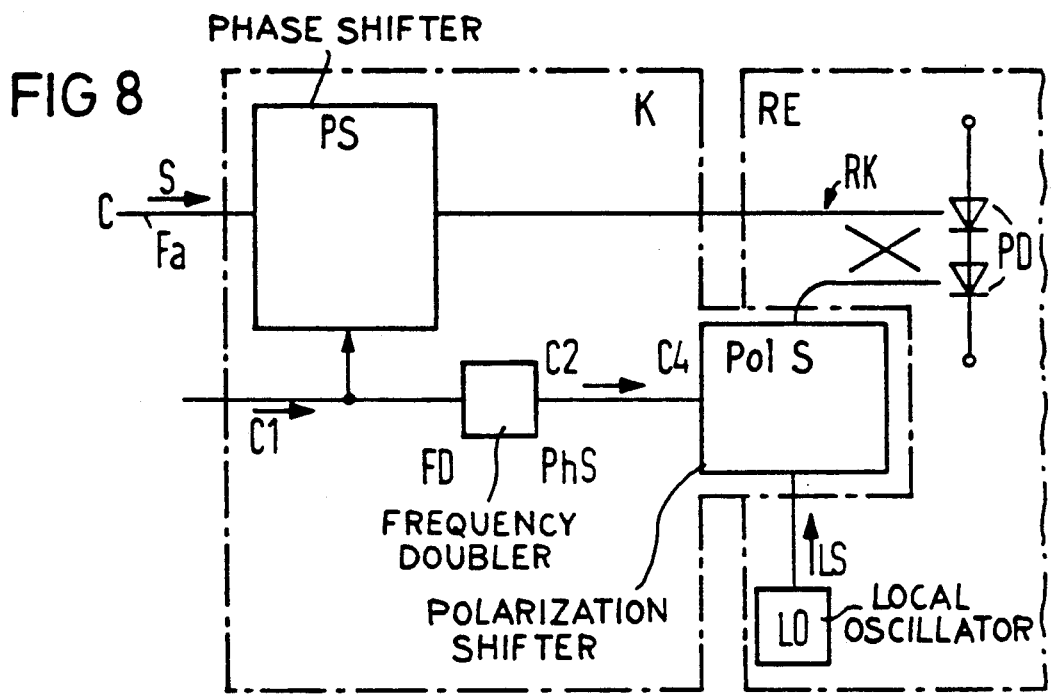
FIG. 8 is a block diagram illustrating a polarization shifter connected between the local oscillator and the optical means for superimposing the transmission signal and the local oscillator signal.

FIG. 1 illustrates an optical heterodyne receiver ÜE which has a keying component K connected to its input and which includes a phase shifter PS. The transmission signal S is supplied to the input of the phase shifter PS and is conducted by way, of example, of an optical fiber Fa which, for example, is linearly polarized and clocked with the clock sequence C illustrated in FIG. 2 which is supplied to the phase shifter PS. The phase of the signal S is shift-keyed between 0 and 90 degrees at the start A1 illustrated in FIG. 2 and at the middle M of the clock time T at every clock of the clock sequence C and is shift-keyed with the clock sequence C1 of FIG. 2 which is symmetrical with the clock sequence C, but has twice the clock frequency as illustrated.

The clock sequence C1 can be obtained from the clock sequence C by frequency doubling the frequency C in a frequency doubler FD.

The transmission signal S which is phase-shift keyed in this manner is supplied to an optical directional coupler ODC in the optical receiver RE and the signal S is superimposed with, for example, a linear polarized optical local oscillator signal LS produced by a local oscillator LO in the receiver ÜE.

After a known opto-electrical conversion in an opto-electrical converter OEW which contains one or two photodetectors PD and supplies an output to an amplifier A, an electrical superposition signal ÜS is generated from the optical signal S and LS superimposed on each other and the superposition signal ÜS contains an intermediate frequency signal which has an extremely low intermediate frequency relative to the clock frequency of the clock sequence which clocks the transmission signal S, in other words, an intermediate frequency that is one or more orders of magnitude lower than the clock frequency.

The superposition signal ÜS is supplied to the branching point P from which two electrical lines L1 and L2 branch off to conduct first and second signal parts ÜS1 and ÜS2 of the superposition signal ÜS. Line 1 includes a delay element DEL which delays the signal part ÜS1 by one half T/2 of the clock time T of the clock sequence C. The output of the delay element DEL is connected to an input e11 of a mixing or multiplying element M1. The line L2 is connected to an input e21 of another mixing or multiplying element M2. A line L3 branches off from line L1 between inputs e11 of the one multiplying element M1 and the delay element DEL and line L3 is connected to another input of the other multiplying element M2 after passing through a delay element DEL1 which provides a very short time delay τ. A line L4 branches off from line L2 and passes through a delay element DEL2 which provides a short time delay τ which has its output connected to another input e12 of the first multiplying element M1.

This structure provides that the one input e11 of the one multiplying element M1 is supplied with a first portion ÜS11 of the first signal portion ÜS1 which has been delayed by T/2 and the input e21 of the other multiplying element M2 is supplied with a first portion ÜS21 of the second signal portion ÜS2 of the superposition signal ÜS. The other input e12 or, respectively, e22 of the one or, respectively, other multiplying element M1 or, respectively, M2 receives a second portion ÜS12 or, respectively, ÜS22 of the first or, respectively, delayed second signal portion ÜS1 or, respectively, ÜS2 which has been delayed by T/2 and which are delayed by a short time τ that is to be selected that is one or more orders of magnitude shorter than the clock time T.

An output a1 of the one multiplying element M1 is connected to input e31 of an adding element AD. The output A2 of the other multiplying element M2 is connected to another input e32 of the adding element SG.

The output a3 of the adding element SG is connected to the input e4 of a low pass filter LPF which produces the output signal AS of the heterodyne receiver RE and supplies it to an output terminal A. The output signal AS is independent of the phase of the transmission signal S and is proportional to the difference between the products that are taken at the outputs a1 or, respectively, a2 of the one or respectively of the other multiplying elements M1 or, respectively, M2. See, for example, the article in Electronics Lett. 24 (1988) No. 9, Pages 567 through 568.

An output AS which is independent of the polarization of the transmission signal S, is obtained when in the apparatus of FIG. 1, the phase shifter PS is replaced by a polarization shifter. An output signal AS that is independent both of phase as well as from polarization of the transmission signal S is obtained when in the apparatus of FIG. 1 a keying portion K is employed which includes both the phase shifter as well as a polarization shifter that can be arranged in an arbitrary sequence following each other. For example, the keying portions K of FIGS. 3 and 4 can be utilized.

FIG. 3 illustrates a keying portion K which has a phase shifter PS which receives the incoming signal S and is clocked at a rate of C illustrated in FIG. 2. Phase shifter is switched with the sequence C1 from the clock signal illustrated in FIG. 2 and supplies an output to the polarization shifter POIS which is shifted with the clock sequence C2 illustrated in FIG. 2 and which is synchronized with the clock sequence C and C1. The clock sequence C2 can be obtained from the clock sequence C1 by frequency doubling C1 in a frequency doubler FD as illustrated in FIG. 3. As a result, the phase of the transmission signal S is keyed between 0° and 90° at the starting time A1 and in the middle time M of every clock time T and the polarization of the signal S is keyed between two mutually orthogonally polarization conditions at the start A1, A2, M and A4 of every quarter of the clock time T. By using the keying portion of FIG. 3, the phase shifter PS can also be switched from the clock sequence C2 and the polarization shifter POIS can be switched with the clock sequence C1. In other words, the clock sequence C2 and C1 can be interchanged.

FIG. 4 illustrates a keying portion K which differs from the keying portion K of FIG. 3 in that the polarization shifter POIS is not keyed with the clock sequence C2 of FIG. 4, but with the clock sequence C3 illustrated in FIG. 5 which is synchronous with the clock sequences C and C1. The clock sequence C3 has the same frequency as the clock sequence C1, but it is phase shifted by one quarter of the clock time T. The clock sequence C3 can be obtained by phase shifting the clock sequence C1 and T/4 in a phase shifter PhS illustrated in FIG. 4. The polarization of the transmission signal S in the keying portion K of FIG. 4 is respectively keyed between two mutually orthogonal polarization conditions at the respective start A2 of the second and A4 of the fourth quarter of the clock time T as illustrated in FIG. 5. In this case, the phase shifter PS could be switched with the clock sequence C3 and the polarization shifter PU could be switched with the clock sequence C1.

The phase shifter PS of FIGS. 1, 3 and 4 could be replaced by a phase modulator PhM that is driven with a sinusoidal control signal C4 illustrated in FIG. 7 which is synchronized with the clock sequence C and wherein the control signal C4 and/or the phase modulator PhM are selected such that the phase of the transmission signal S is sinusoidally modulated with an amplitude of 70.2° and the zero axis crossings of the sinusoidal modulation occur at the start A1 and in the middle M of the clock time T. The keying portion illustrated in FIG. 6 is an example of a keying portion K which has a phase modulator PhM or by an output signal AS which is independent both of the phase as well as the polarization of the transmission signal S is obtained by the additional polarization shifter POIS connected to the output of the phase modulator PhM as shown and which is switched with the clock sequence C2 or with the clock sequence C3.

Figure 9:
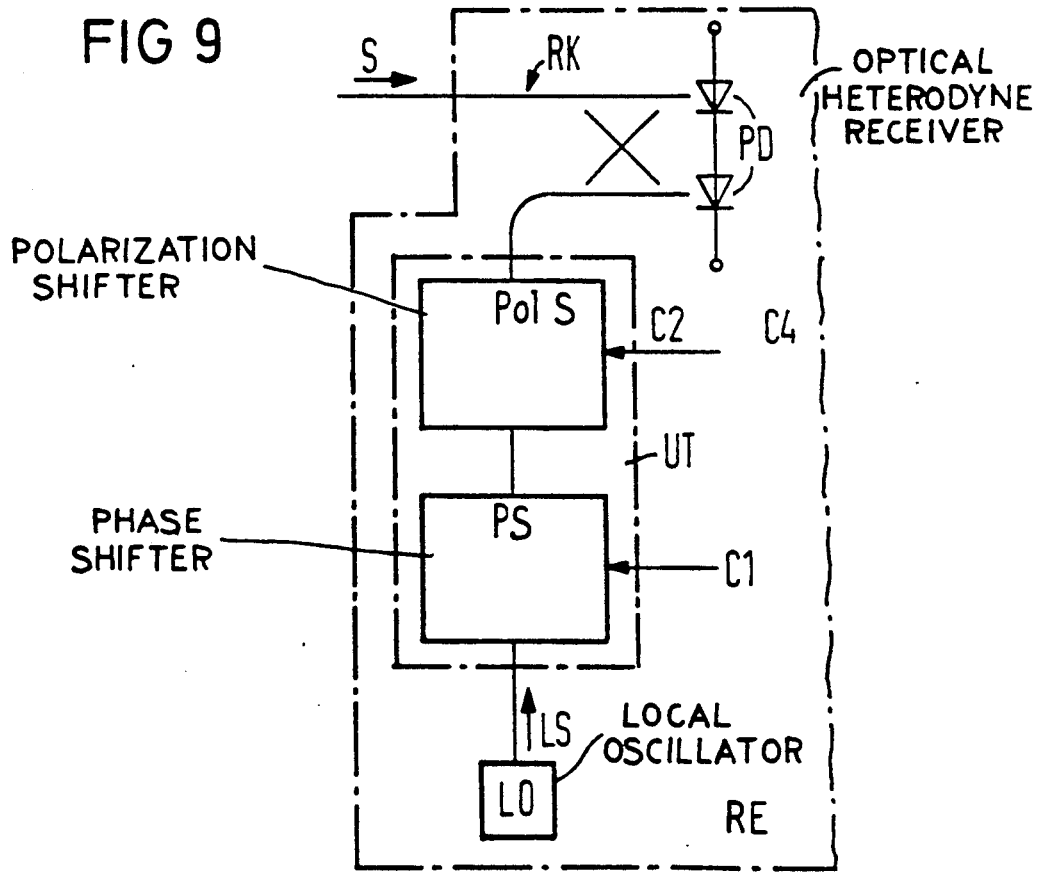
FIG. 9 is a block diagram illustrating a phase shifter and a polarization shifter which are arranged between the optical means and the local oscillator.

The phase shift keying or the phase modulation can be accomplished at the transmitter side or at the receiver side. For example, immediately before the receiver or following the local oscillator. The polarization shift keying can be implemented at the transmitter side or at the receiver side following the local oscillator. FIG. 8 illustrates the polarization shifter POIS of the keying portion K which keys the polarization condition of the local oscillator LS instead of that of the transmission signal AS. The phase shifter PS by contrast keys the phase of the transmission signal S at the transmitter side or at the receiver side. In the example of FIG. 9, only the local oscillator signal LS and not the transmission signal S is keyed in phase and polarization. In the example, of FIG. 10, the phase of the local oscillator signal LS is keyed and the polarization of the transmission signal is keyed at the transmitter side. In the examples of FIGS. 8-10, the phase shifter PS can be replaced by a sinusoidally control led phase modulator PhM that is driven with a sinusoidal control signal C4 illustrated in FIG. 7. In the example of FIG. 9, the phase shifter PS can also be clocked with the clock sequence C2 or C4 and the polarization shifter can be clocked with the clock sequence C1. The other components in FIGS. 8, 9 and 10 are connected as illustrated.

Although the invention has been described with respect to preferred embodiments, it is not to be so limited as changes and modifications can be made which are within the full intended scope of the invention as defined by the appended claims.

I claim as my invention:

1. A method for producing a phase-insensitive and/or polarization-insensitive optical heterodyne reception for a FSK-modulated, optical transmission signal (S), whereby an electrical superposition signal (ÜS) is generated by superimposing the transmission signal (S) with an optical local oscillator signal (LS) which are supplied to an optoelectrical transducer which generates an electrical heterodyne signal "ÜS", and an output signal (AS) is acquired from said superposition signal (ÜS) by low-pass filtering, comprising the steps of, keying at every clock signal, the phase of said transmission signal (S) or the local oscillator signal (LS) between 0° and 90° at the start (A1) and in the middle (M) of the clock period (T) and/or keying at every clock signal of the transmission signal (S), the polarization of said transmission signal (S) or the local oscillator signal (LS) between two mutually orthogonal polarization conditions at least at the start (A2) of the second quarter and at the start (A4) of the fourth quarter of said clock period, separating said superposition signal into first and second signal positions; (T); delaying said first signal portion (ÜS1) of the superposition signal (ÜS) by one-half (T/2) of the clock time (T) relative to said second signal position (ÜS2), delaying a portion of said second signal portion (ÜS2) for a short time ($\tau$), and a first portion (ÜS21) of said first signal portion (ÜS21) by a short time span ($\tau$) multiplying said second signal portion (ÜS21) with said first portion (ÜS12) of the first signal portion, multiplying a second portion (ÜS11) of said first signal portion which has been delayed by a short time span ($\tau$) with the delayed, second signal portion (ÜS22), adding the outputs which have been multiplied of the first and second portions (ÜS11, ÜS21, ÜS12, ÜS22) which have been multiplied together, and low-pass filtering the added output to obtain said output signal (AS).

2. A method according to claim 1, wherein the polarization of the transmission signal (S) or of the local oscillator signal (LS) is keyed between mutually orthogonal polarization conditions at the start (A1, A2, M, A4) of every quarter of the clock time (T).

3. A method for obtaining a phase-insensitive and/or polarization-insensitive optical heterodyne reception for a FSK-modulated, optical transmission signal (S), whereby an electrical superposition signal (ÜS) is generated by superimposing the transmission signal (S) with an optical local oscillator signal (LS) which are supplied to an optoelectrical transducer which generates an electrical heterodyne signal "ÜS", and an output signal (AS) is acquired from said superposition signal (ÜS) by low-pass filtering, comprising the steps of, keying at every clock signal, the phase of said transmission signal (S) or the local oscillator signal (LS) between 0° and 90° at least at the start (A2) of the second quarter and at the start (A4) of the fourth quarter of the clock period (T) and/or keying at every clock signal of the transmission signal (S), the polarization of said transmission signal (S) or the local oscillator signal (LS) between mutually orthogonal polarity conditions at the start (A1) and in the middle (M) of this clock period (T); separating said superposition signal into first and second portions, delaying a first signal portion (ÜS1) of the superposition signal (ÜS) by half (T/2) of the clock period (T) relative to said second signal portion (ÜS2), delaying a portion of said second signal portion, delaying a portion of said delayed first signal portion, multiplying said first signal portion (ÜS21) with said second signal portion (ÜS12) of the second signal portion, multiplying a second portion (ÜS11) of the first signal portion which has been delayed by a short time span (τ) with the delayed, second signal (ÜS22); adding the outputs which have been multiplied, and low-pass filtering the added output to obtain said output signal (AS).

4. A method according to claim 3, wherein the phase of the transmission signal (S) or of the local oscillator signal (LS) is keyed between 0° and 90° at the start (A1, A2, M, A4) of every quarter of the clock time (T).

5. A method for obtaining a phase-insensitive and/or polarization-insensitive optical heterodyne reception for a FSK modulated, optical transmission signal (S), whereby an electrical superposition signal (ÜS) is generated by superimposing the transmission signal (S) with an optical local oscillator signal (LS) which are supplied to an optoelectrical transducer which generates an electrical heterodyne signal "ÜS" and an output signal (AS) is acquired from said superposition signal (ÜS) by low-pass filtering, comprising the steps of, sinusoidally modulating at every clock the phase of the transmission signal (S) or the local oscillator (LS) so that with an amplitude of 70.2° that the zero-axis crossings of the sine wave start at (A1) and in the middle (M) of the clock period separating said superposition signal into first and second signal portions (T); delaying said first signal portion (ÜS1) of the superposition signal (ÜS) by one-half (T/2) of the clock period (T) relative to said second signal portion (ÜS2), multiplying a first portion (ÜS11) of the delayed, first signal portion (ÜS1) and the delayed portion (ÜS22) of said second signal portion which has been delayed relative to the second signal portion (ÜS2) by a short time (τ), multiplying a second portion (ÜS21) of the second signal portion (ÜS2) and a second portion (ÜS12) of the first signal portion (ÜS1) which has been delayed a short time (τ) relative to the delayed, first signal portion (ÜS1), adding the first and second portions which have been multiplied together, and low-pass filtering the added output to obtain said output signal (AS).

6. A method according to claim 5 for obtaining a phase-insensitive and polarization-insensitive, optical heterodyne reception for a FSK-modulated transmission signal (S), wherein the polarization of the transmission signal (S) or of the local oscillator signal (LS) is keyed between two mutually orthogonal polarization conditions at the start (A2) of the second and at the start (A4) of the fourth quarter of the clock time (T).

7. A method according to claim 6, wherein the polarization of the transmission signal (S) or of the local oscillator signal (LS) is keyed at the start (A1, A2, M, A4) of every quarter of the clock time (T).

8. Apparatus for a phase-insensitive, polarization-insensitive optical heterodyne receiver for a FSK modulated optical transmission signal comprising: a clockable phase shifter (PS) or sinusoidally controllable phase modulator (PhM) for keying or sinusoidal modulating the phase of the transmission signal (S) or of the local oscillator signal (LS), a clockable polarization shifter POIS for keying the polarization of the transmission signal (S) or the local oscillator signal (LS), and an optical heterodyne receiver (RE) which has an optical means (ODC) for superimposing the optical transmission signal (S) and the local oscillator signal (LS), an opto-electrical converter means for converting the two, superimposed optical signals (S, LS) into an electrical superposition signal, a branch point (P) to which the superposition signal (ÜS) is supplied, a delay element (DEL) which delays by one-half (T/2) the clock time (T), two multiplying elements (M1, M2), two delay elements (DEL1, DEL2) each of which respectively delay by short times (τ), a summing element (AD) and a low-pass filter (LPF), the branch point (P) is connected, first, to the one input (e11) of one (M1) of said two multiplying elements (M1, M2) through the delay element (DEL) that delays by one half (T/2) the clock time (T) and is also directly connected to an input (e21) of the other multiplying element (M2), and the one input (e11, e21) of the two multiplying elements (M1, M2) are connected to the inputs (e12, e22) of the other multiplying element (M2 or, respectively, M1) through one of the two delay elements (DEL1, DEL2) which delay by short times (τ), the outputs (a1, a2) of the two multiplying elements (M1, M2) are connected to inputs (e31, e32) of the summing element (AD), and one output (A3) of the summing element (AD) is connected to an input (e) of the low-pass filter (LPF).

* * * * *